United States Patent [19]

Clark et al.

[11] Patent Number: 4,641,817
[45] Date of Patent: Feb. 10, 1987

[54] VIBRATION ABSORBING MOUNTINGS

[75] Inventors: Michael Clark, Coventry; Kenneth J. Taylor, Nuneaton, both of England

[73] Assignee: Dunlop Limited, England

[21] Appl. No.: 590,953

[22] Filed: Mar. 19, 1984

[30] Foreign Application Priority Data

Apr. 5, 1983 [GB] United Kingdom ............... 8309124
Jul. 2, 1983 [GB] United Kingdom ............... 8318040

[51] Int. Cl.$^4$ ............................................. F16M 5/00
[52] U.S. Cl. .................. 267/140.1; 248/562; 267/8 R
[58] Field of Search ............... 267/8 R, 35, 113, 136, 267/140.1, 141, 141.4, 153, 64.11, 64.23; 188/268; 180/300; 248/562, 634, 636, 613, 659; 92/99, 103 F

[56] References Cited

U.S. PATENT DOCUMENTS

| | | | |
|---|---|---|---|
| 3,658,314 | 4/1972 | Luzsicza | 248/562 X |
| 3,874,646 | 4/1975 | Vernier | 267/140.1 |
| 4,161,304 | 7/1979 | Brenner et al. | 267/140.1 X |
| 4,199,128 | 4/1980 | van den Boom et al. | 267/140.1 X |
| 4,458,888 | 7/1984 | Wolf et al. | 267/140.1 |
| 4,511,126 | 4/1985 | Bernuchon et al. | 267/140.1 |

FOREIGN PATENT DOCUMENTS

| | | | |
|---|---|---|---|
| 0027751 | 4/1981 | European Pat. Off. | 267/140.1 |
| 0042910 | 1/1982 | European Pat. Off. | |
| 0058408 | 8/1982 | European Pat. Off. | |
| 0575960 | 4/1958 | Italy | 267/140.1 |
| 0811748 | 4/1959 | United Kingdom | |
| 2041488 | 9/1980 | United Kingdom | |
| 2041485 | 9/1980 | United Kingdom | 267/8 R |
| 1581935 | 12/1980 | United Kingdom | |
| 1583963 | 2/1981 | United Kingdom | |
| 0874394 | 10/1981 | U.S.S.R. | 267/64.23 |

Primary Examiner—George E. A. Halvosa
Assistant Examiner—Robert J. Oberleitner
Attorney, Agent, or Firm—Stevens, Davis, Miller & Mosher

[57] ABSTRACT

A vibration absorbing mounting, e.g. a motor car engine mounting, has a rubber spring member mounted between end members and hydraulically damped. The interior of the mounting comprises two liquid-filled chambers communicating with one another through a restricted passageway and which are separated by an intermediate diaphragm and bounded at their other sides, respectively, by the rubber spring member and a second diaphragm. The second diaphragm is provided with a central support and the intermediate diaphragm may have an unyielding central portion, to enable excessive movement of the end members towards one another to be resisted.

11 Claims, 5 Drawing Figures

VIBRATION ABSORBING MOUNTINGS

This invention relates to vibration absorbing mountings, and particularly, but not exclusively, to engine mountings for motor vehicles.

The engine of a motor car is normally mounted on vehicle chassis members by mounting devices which incorporate a block or ring of rubber bonded to metal end members which are fastened respectively to the engine and to the chassis member. Such mountings provide a degree of isolation between the engine and the chassis of the vehicle, but in order to improve the performance of such mountings it has been proposed to provide hydraulic damping by incorporating liquid-filled chambers within the rubber blocks, the chambers being arranged to communicate through relatively restricted passages so as to damp the transmission of vibrations from the engine to the chassis via the rubber mounting.

The construction of liquid-filled engine mountings presents problems of construction, and there is a danger that if liquid escapes from the mounting and/or excessive load is applied to the mounting the resulting movement of the end members may be great enough to cause damage to the mounting, resulting in failure in service.

One object of the present invention is to provide an engine mounting which is particularly well-adapted to resist overload without damage, and a further object is to provide an engine mounting which may be conveniently and cheaply assembled.

Another object of the invention is to provide an engine mounting design which lends itself readily to the incorporation of required design characteristics to suit particular applications, i.e. which is capable of providing required stiffness and damping characteristics over a wide range of frequencies.

According to the invention, a vibration absorbing mounting comprises a pair of end members, a rubber spring member bonded respectively to each of the end members, a rubber intermediate diaphragm secured to one of the end members and defining with the rubber spring member a first liquid-filled chamber, and an annular rubber second diaphragm member secured to the second end member at its periphery and to a central support and defining a second liquid-filled chamber between the second diahragm and the intermediate diaphragm, a restricted passageway being provided between the two liquid-filled chambers.

Preferably, the intermediate diaphragm comprises a central rigid block bonded therein to provide the central region of the intermediate diaphragm with an unyielding central portion, and the central support of the second diaphragm is also rigid so that the block and the central support provide means for resisting excessive movement of the end members towards one another when an overload is applied.

The term "rubber" as used in this Description is intended to embrace any suitable natural or synthetic elastomeric material.

Two embodiments of the invention will now be described, by way of example, with reference to the accompanying drawings in which.

Figure 1:
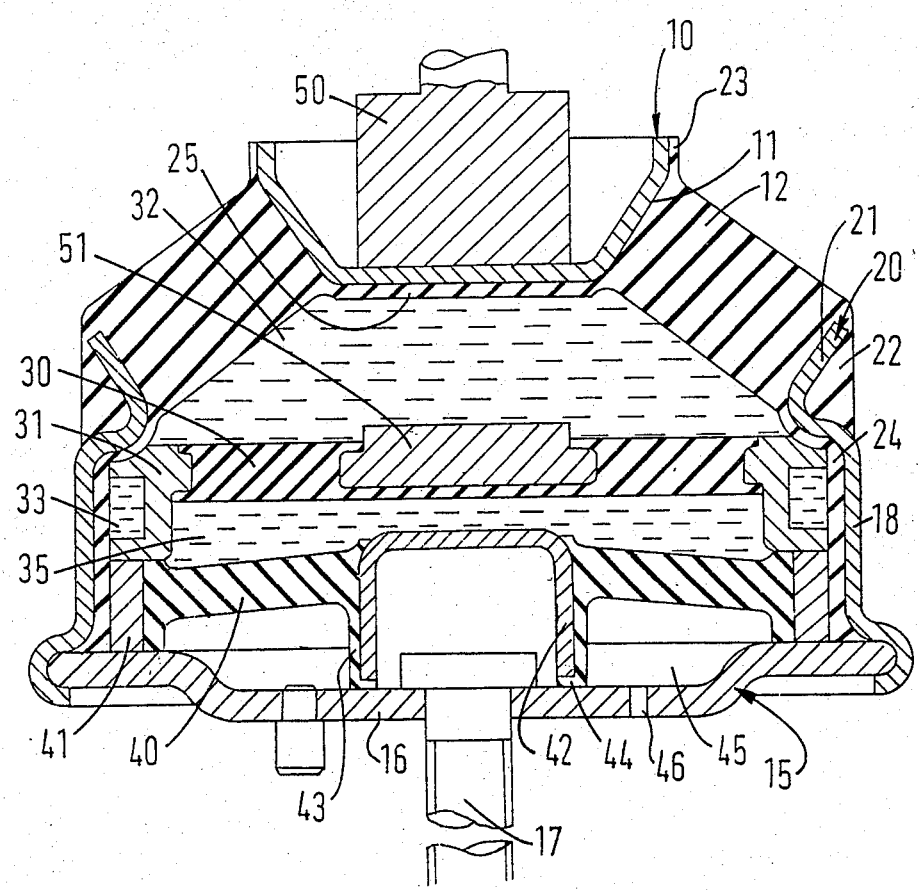
FIG. 1 is an axial cross-section through a vibration absorbing engine mounting.

The mounting shown in FIG. 1 comprises a first end member 10 which is a cup-shaped steel presisng having a frusto-conical surface 11 to which is bonded an annular rubber spring member 12.

A second end member 15 comprises a circular dished plate 16 arranged to be secured by means of a bolt 17 to a vehicle chassis member, and the end member 15 also comprises a generally cylindrical casing member 18 secured to the plate 16 by swaging. Before the swaging operation, the end member 10 and casing member 18 are located in a suitable moulding press to enable the rubber spring 12 to be moulded and bonded to these two members as indicated in the drawing, the upper end 20 of the casing member being shaped to provide a flange 21 parallel to the conical surface 11, giving the spring 12 the characteristics of a rubber/metal combined shear and compression spring. The rubber moulding process is controlled to provide an outer layer of rubber 22 surrounding the flange 21 to improve the sealing of the device against external contamination, and an extended lip 23 of rubber is formed on the end member 10 for the same purpose.

Within the casing member 18, the moulding process provides a layer of rubber 24 over the whole of the inner surface. A layer 25 of rubber, continuous with the spring 12 and the inner layer 24 covers the end member 10.

An intermediate rubber diaphragm 30 is bonded to a support ring 31 which is a sliding fit within the inner rubber layer 24 so that when the intermediate diaphragm is inserted in the position shown a first chamber 32 is enclosed between the spring 12 and the intermediate diaphragm. A passage for liquid (not shown) is formed in the ring 31 to communicate between the chamber 32 and an annular space 33 formed between the ring 31 and the rubber lining 24. A second passage (also not shown) is provided between the annular space 33 and a chamber 35, the second passage being positioned at a point diametrically opposite to the first passage when considering the ring 31 in plan view. Thus fluid communication via the first and second passages requires circulation of the fluid from one passage to the other around half the circumference of the annular space 33 and the flow of fluid between the chamber 32 and the chamber 35 is thus subject to flow through a relatively long restricted passageway to provide a damping action.

The chamber 35 is defined at one side by the diaphragm 30 and at the other side by a second diaphragm 40 which is annular in form and is bonded at its outer circumference to a metal ring 41 which is a sliding fit within the rubber inner lining 24. The central portion of the diaphragm 40 is bonded to a central support boss 42 constituted by a hollow metal pressing the cylindrical surface of which is coated with the rubber of the diaphragm 40 forming a layer 43 which also extends as a lip 44 under the end of the boss 42.

A space 45 between the diaphragm 40 and the end plate 16 is connected to atmosphere via a vent hole 46.

It will be noted that the boss 42 is of robust construction and when excessive load is placed on the mounting by an engine support 50 welded to the end member 10 a rigid metal block 51 moulded in the centre of the diaphragm 30 transmits the imposed thrust to the central boss 42 and the mounting thus provides a strong and rigid support to resist the overload.

The action of the mounting described above is as follows:

Relatively low frequency vibrations acting vertically, i.e. axially, tend to move the end member 10 towards the end member 15 and a transfer of fluid from the first chamber to the second chamber takes place through the restricted passageway described. Such vertical movement is resisted by the spring action of the rubber combined shear and compression spring 12 and by the force required to deform the second diaphragm 40 as fluid passes into the second chamber 35. It will be appreciated that owing to the annular structure of the diaphragm 40 the passage of fluid into the chamber 35 will cause the diaphragm 40 to bulge downwardly towards the plate 16 and this will be opposed by the consequent tension set up in the rubber.

At higher frequencies, there will be insufficient time for fluid to pass through the restricted passageways, and the intermediate diaphragm 30 will be deflected by the resulting pressure difference between the liquid in the chamber 32 and the liquid in the chamber 35. Deflection of both the diaphragms 30 and the diaphragm 40 will therefore be required, and the stiffness of the assembly is therefore increased.

By careful selection of the thicknesses and types of rubber incorporated in the first and second diaphragms and in the rubber combined shear and compression spring 12, and by selection of the cross-sectional area of the annular space 33 any required springing and damping characteristics can be provided for a particular application.

Figure 2:
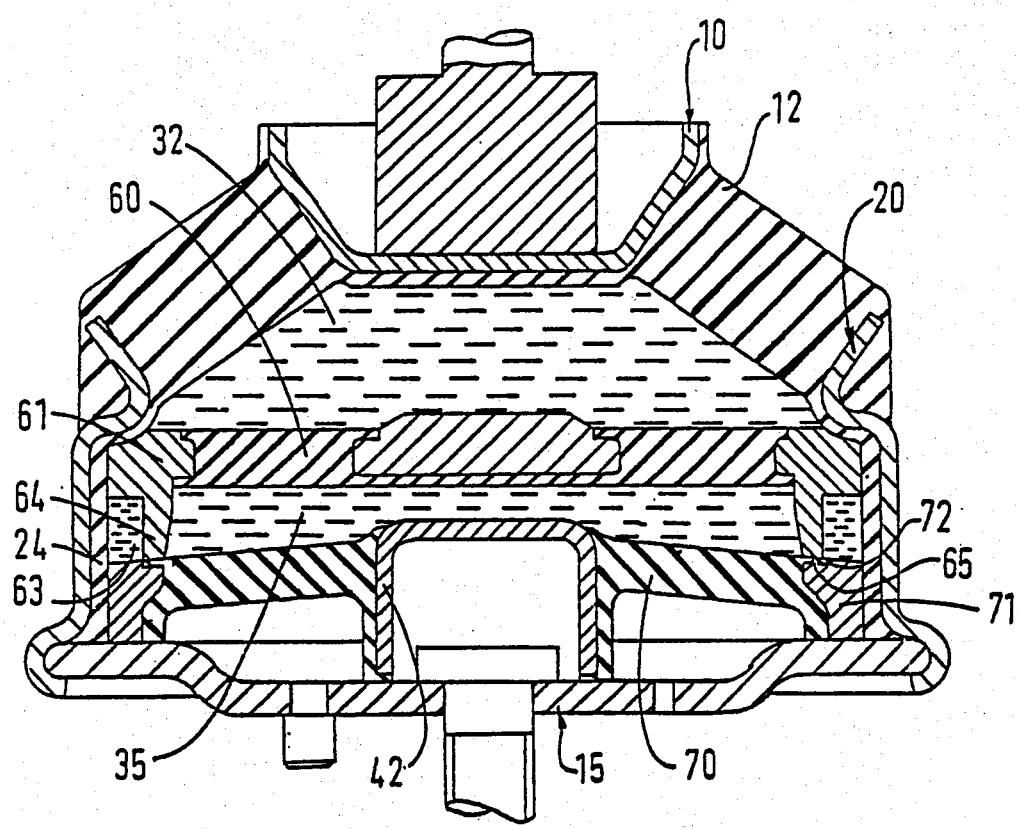
FIG. 2 is a similar view to FIG. 1 showing a modification.

FIG. 2 shows a modified mounting in accordance with the invention those parts which are similar to parts illustrated in FIG. 1 being identified by the same reference numerals. In the alternative arrangement of the intermediate diaphragm 60 shown in FIG. 2, a support ring 61 is a sliding fit within the inner rubber layer 24 and partially encloses an annular space 63. A cylindrical flange 64 formed on the ring 61 is arranged to engage a rubber lip 65 formed integrally with the second diaphragm 70 to seal the annular space 63, the diaphragm 70 being bonded to a metal ring 71 which is shaped so as to provide a rebate 72 in which the lip 65 is bonded and supported. This arrangement employs easily manufactured and assembled components to provide a relatively cheaper and effective assembly.

In either of the mountings described above, a longer restricted passageway may be provided to connect the two liquid-filled chambers if the respective passages from the annular space (33 or 63) into the chambers 32 and 35 are located in positions which are only slightly spaced from one another in the circumferential sense and a baffle is provided between these two passages so that liquid has to travel around almost the whole circumference of the annular space 33 or 63 in order to pass from one chamber to the other.

Figure 3:
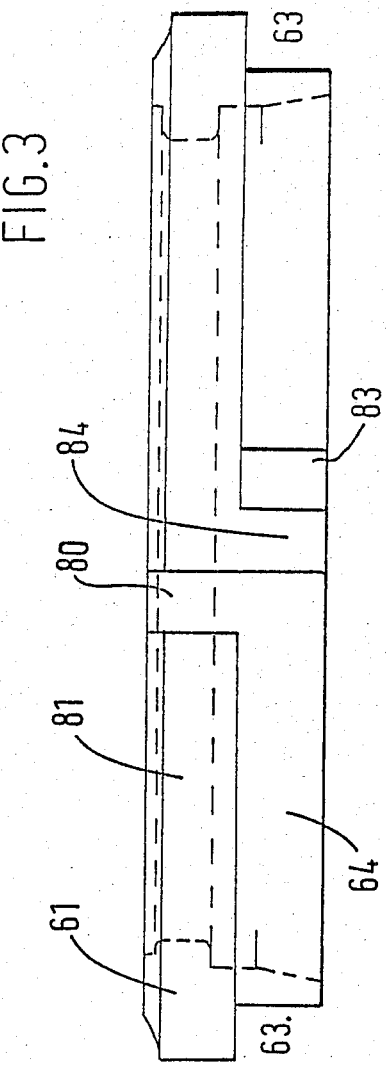
FIG. 3 is a side view of a support ring.
Figure 4:
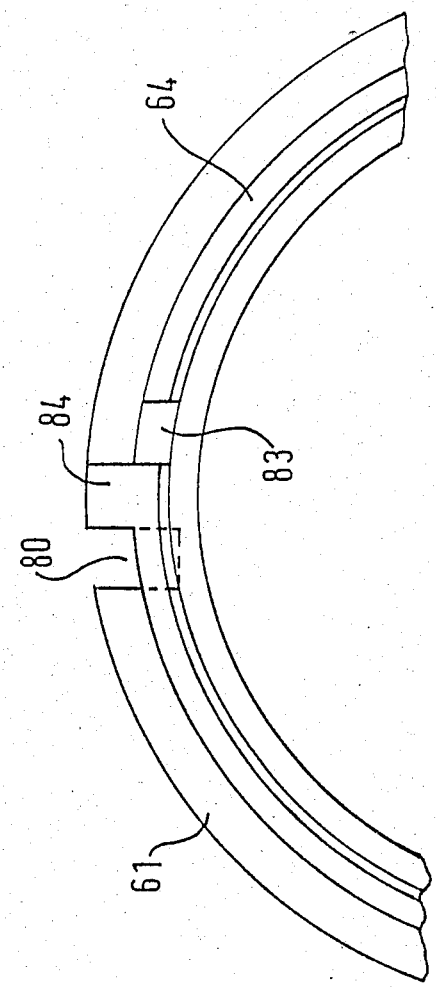
FIG. 4 is a plan view of the underside of the ring shown in FIG. 3.

FIGS. 3 and 4 show a practical construction of the support ring 61 of FIG. 2 to provide a long restricted passageway. The annular space 63 formed on the radially outer side of the cylinderical flange 64 communicates with the chamber 32 through a passage 80 formed as a cut-out portion of the body portion 81 of the ring 61, the passage 80 being extended radially inwardly (see the dotted-line outline in FIG. 4) sufficiently to expose it at its upper end clear of the rubber lining layer 24. The chamber 35 is also conencted by a cut-out passage 83 to the annular space 63, but the passages 80 and 83 are separated by a baffle 84 which seals the annular space 63 in a position between the passages 80 and 83 so that fluid flowing from one passage to the other has to travel around almost the whole circumference of the ring 61.

Whilst in the mountings described above overloads in one direction, tending to compress the mounting, are effectively provided for, they do not incorporate specific structures for resisting any overload in the opposite direction which might be sufficient to detach the rubber spring member from one of the end members.

Figure 5:
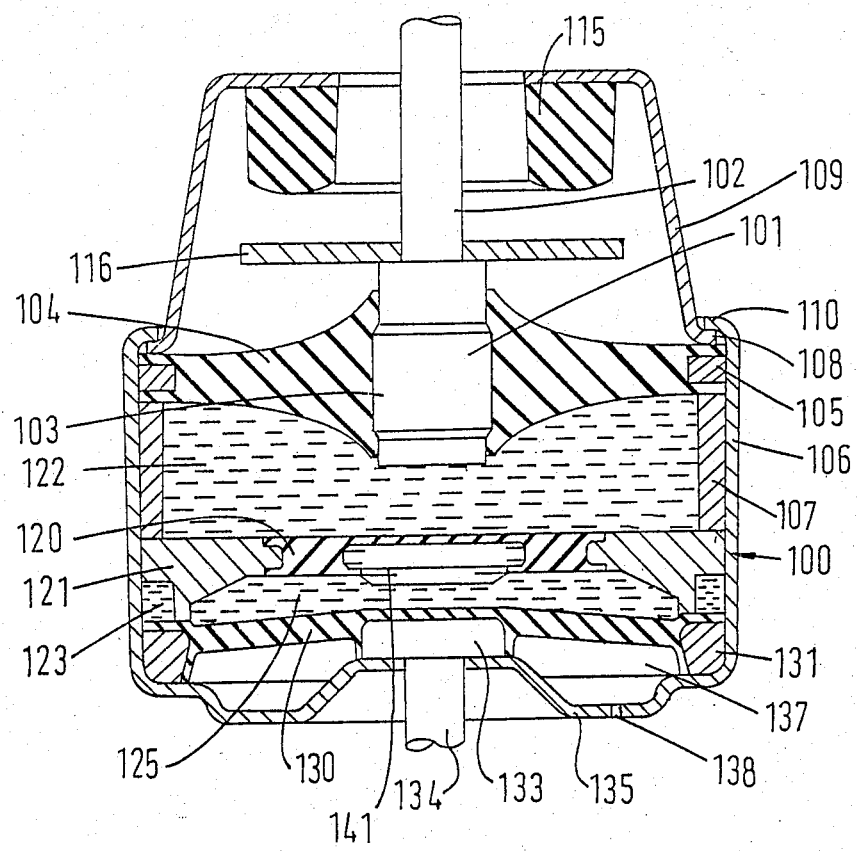
FIG. 5 is an axial cross-section through a vibration absorbing engine mounting constituting an engine torque reactor.

The torque reactor 100 shown in FIG. 5 comprises a first end member 101 which comprises a steel shaft 102 having an enlarged portion 103 to which is bonded an annular rubber spring member 104. The spring member 104 is bonded at its outer periphery to a steel ring 105 and is fitted slidably into a steel canister 106 where it is held between a spacer sleeve 107 and the rim 108 of a cap 109 which is itself secured in position by a spun-over lip 110 of the canister 106. The canister 106, forming a body portion, and the cap 109 together constitute a second end member of the mounting and an annular rubber bump stop 115 is secured within the cap for engagement by an abutment formation provided by a washer 116 mounted on the shaft 102 of the first end member 101, in the event of excessive outward movement of the first end member from the mounting under tensile loads. The cap 109 and bump stop 115 thus provide a retaining structure to limit relative movement of the end members under tensile loads.

An intermediate rubber diaphram 120 is bonded to a support ring 121 which is a sliding fit within the canister 106 so that a first chamber 122 is enclosed between the spring 104 and the intermediate diaphragm. A passage for liquid (not shown) is formed in the ring 121 to communicate between the chamber 122 and an annular space 123 formed between the ring 121 and the canister 106. A second passage (also not shown) is provided between an annular space 123 and a chamber 125, the second passage being positioned at a point diametrically opposite to the first passage when considering the ring 121 in plan view. Thus fluid communication via the first and second passages requires circulation of the fluid from one passage to the other around half the circumference of the annular space 123 and the flow of fluid between the chamber 122 and the chamber 125 is thus subject to flow through a relatively long restricted passageway to provide a damping action.

The chamber 125 is defined at one side by the diaphragm 120 and at the other side by a second diaphragm 130 which is annular in form and is bonded at its outer circumference to a metal ring 131 which is a sliding fit within the canister 106. The central portion of the diaphragm 130 is supported by the head 133 of a bolt 134 which is bonded to the diaphragm 130 and arranged to secure the base 135 of the canister to a torque reactor support bracket (not shown).

A space 137 between the diaphragm 130 and the base 135 is connected to atmosphere via a vent hole 138.

It will be noted that excessive compressive loads tending to move the end member 102 towards the base 135 will ultimately be resisted by the head 133 of the bolt 134, which supports the central portion of the diaphragm 130, and the overload will be transmitted through a rigid metal block 141 bonded in the central region of the intermediate diaphragm 120. This provides a "bump stop" for any transient loads which may be sufficient to drive the end member 102 into engagement with the intermediate diaphragm and the intermediate diaphragm into engagement with the second diaphragm 130.

As indicated above, excessive transient tensile loads are resisted by engagement of the washer 116 with the bump stop 115. This also provides a fail-safe design which ensures that even if the rubber spring member 104 becomes detached from one of the end members, or destroyed, the first end member 102 is unable to become detached from the second end member (casing 106 and cap 109).

The torque reactor 100 thus provides an efficient torque-resisting engine mounting having fail-safe characteristics. By suitable design of the rubber spring member 104, a desired low uniform spring rate may be obtained, and the spring and damping characteristics may be suitably refined by design of the intermediate and second diaphragms.

In the examples described above, the restricted passageways for the flow of fluid between the first and second chambers are either fully annular or half-annular. In other examples, not shown, shorter restricted passageways may be provided by the use of suitable baffles to divide the annular passageway into two or more individual passageways each with two separate passages leading respectively into the first and second chambers: by providing a plurality of shorter passageways of appropriate cross-sectional area it is possible to achieve laminar flow characteristics which enable a more evenly graded damping/frequency response curve to be obtained.

The design of vibration absorbing mountings having required characteristics is also facilitated by the incorporation in the intermediate diaphragm of a central block (51, 141) of a selected mass. By choosing a suitable material or dimensions for the block it is possible to vary the frequency at which resonance of the intermediate diaphragm together with the fluid mass and the mass of the block occurs, and thus to enable the high frequency performance to be "fine tuned" for specific applications.

The vibration absorbing mountings described above are simple and robust in construction, and by the use of separately mounted interfitting spring and diaphragm members are readily assembled on a production line. Important advantages are provided in respect of flexibility of design and inherent fail-safe characteristics, overloads being easily resisted by the use of rigid members in the intermediate diaphragm and associated central support of the second diaphram

What is claimed is:

1. A vibration absorbing mounting comprising a first end member and a second end member, a rubber spring member bonded respectively to each of the end members, a rubber intermediate diaphragm secured to the second end member and defining with the rubber spring member a first liquid-filled chamber, and an annular rubber second diaphragm member secured at its periphery to the second end member and to a central support provided on the second end member and defining a second liquid-filled chamber between the second diaphragm and the intermediate diaphragm, the intermediate diaphragm being bonded to a support ring fitted within the second end member, the outer periphery of said support ring being shaped so as to define an annular space between the ring and the inner surface of the second end member, said annular space communicating respectively with said first and second chambers in circumferentially spaced positions so as to provide a long restricted passageway through which fluid may flow from one chamber to the other to provide a damping action.

2. A vibration absorbing mounting according to claim 1 wherein the first end member comprises a frusto-conical surface to which is bonded the rubber spring member, the rubber spring member being of annular form and wherein the second end member comprises a generally cylindrical casing member having a frusto-conical flange, the rubber spring member being bonded to said frusto-conical surface on the first end member and to the frusto-conical flange on the casing member so as to provide an annular rubber/metal combined shear and compression spring.

3. A vibration absorbing mounting according to claim 2 wherein the rubber of the spring member continues within the casing member to provide an inner rubber layer therefor.

4. A vibration absorbing mounting according to claim 1 wherein the support ring comprises a cylindrical flange making sealing engagement with the second diaphragm member to define said annular space.

5. A vibration absorbing mounting according to claim 1 wherein the support ring comprises a cylindrical flange and in which two passages are provided in circumferentially spaced positions with a baffle between the two passages to seal the annular space, said passages communicating respectively with said first and second chambers.

6. A vibration absorbing mounting according to claim 1 wherein the second diaphragm member is bonded to a central support boss and to an outer circumferential metal ring which is a sliding fit within a rubber inner lining of a casing member.

7. A vibration absorbing mounting according to claim 1 wherein one of the end members comprises a retaining structure which is arranged to be engageable with an abutment formation on the other end member to limit relative movement of the end members under tensile loads.

8. A vibration absorbing mounting according to claim 7 wherein the retaining structure comprises a cap secured to a body portion of the second end member, the first end member comprising a shaft extending through a hole in the cap and having a formation within the cap to prevent it from being withdrawn therefrom.

9. A vibration absorbing mounting according to claim 8 wherein the abutment formation consists of a washer and the interior of the cap comprises an annular rubber bump stop for engagement by the washer.

10. A vibration absorbing mounting comprising a first end member and a second end member, a rubber spring member bonded respectively to each of the end members, a rubber intermediate diaphragm secured to the second end member and defining with the rubber spring member a first liquid-filled chamber, and an annular rubber second diaphragm member secured at its periphery to the second end member and to a central support engaging the second end member and defining a second liquid-filled chamber between the second diaphragm and the intermediate diaphragm, a restricted passageway being provided between the two liquid-filled chambers; the intermediate diaphragm comprising an unyielding central portion and the central support of the second diaphragm being rigid so that the unyielding central portion of the intermediate diaphragm and the rigid central support of the second diaphram are positioned to abut when subjected to excessive compressive force to provide means for resisting excessive movement of the end members towards one another.

11. A vibration absorbing mounting comprising a first end member and a second end member, a rubber spring member bonded respectively to each of the end members, a rubber intermediate diaphragm secured to the second end member and defining with the rubber spring member a first liquid-filled chamber, and an annular rubber second diaphragm member secured at its periphery to the second end member and to a central support provided on the second end member and defining a second liquid-filled chamber between the second diaphragm and the intermediate diaphragm, a restricted passageway being provided between the two liquid-filled chambers, the rubber of the spring member continuing within the second end member to provide an inner rubber liner therefore and the intermediate diaphragm is bonded to a support ring which is in a sliding fit within the inner rubber liner of the second end member.

* * * * *